(12) United States Patent
Sakaguchi (10) Patent No.: US 11,142,043 B2
(45) Date of Patent: Oct. 12, 2021

(54) VEHICULAR AIR-CONDITIONING UNIT (71) Applicant: DENSO CORPORATION, Kariya (JP)

(72) Inventor: Taisuke Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 146 days.

(21) Appl. No.: 16/090,604

(22) PCT Filed: Feb. 9, 2017

(86) PCT No.: PCT/JP2017/004781
§ 371 (c)(1),
(2) Date: Oct. 2, 2018

(87) PCT Pub. No.: WO2017/175477
PCT Pub. Date: Oct. 12, 2017

(65) Prior Publication Data
US 2019/0111765 A1 Apr. 18, 2019

(30) Foreign Application Priority Data
Apr. 5, 2016 (JP) .............................. JP2016-075952

(51) Int. Cl.
*B60H 1/32* (2006.01)
*B60H 1/00* (2006.01)

(52) U.S. Cl.
CPC ........ *B60H 1/3233* (2013.01); *B60H 1/00521* (2013.01)

(58) Field of Classification Search
CPC ........................... B60H 1/3233; B60H 1/00521
(Continued)

(56) References Cited

U.S. PATENT DOCUMENTS

| 5,117,653 A | * | 6/1992 | Kil | .......................... F24F 13/22 |
| | | | | 62/291 |
| 6,070,425 A | * | 6/2000 | Ito | ...................... B60H 1/00028 |
| | | | | 62/285 |

(Continued)

FOREIGN PATENT DOCUMENTS

| EP | 2062762 A1 | 5/2009 |
| JP | S53019936 U | 2/1978 |

(Continued)

*Primary Examiner* — Eric S Ruppert
*Assistant Examiner* — Kirstin U Oswald
(74) *Attorney, Agent, or Firm* — Harness, Dickey & Pierce, P.L.C.

(57) ABSTRACT

An air-conditioning case of a vehicular air-conditioning unit has a cooler accommodation portion defining a cooler accommodation space in which a cooler is accommodated, and a downstream portion defining a downstream space. The cooler accommodation portion includes an accommodation bottom portion defining a bottom portion space. The accommodation bottom portion includes a drainage hole through which condensed water is drained, and the drainage hole is located closer to one end of the accommodation bottom portion than to another end in a longitudinal direction of a lower end of the cooler. A bottom surface of the accommodation bottom portion is inclined with respect to a horizontal line. The air-conditioning case includes a bottom portion rib. The bottom portion rib includes a communication slit. The communication slit is located closer to the one end than to the other end in the longitudinal direction.

4 Claims, 4 Drawing Sheets (58) Field of Classification Search
USPC .......................................................... 62/291
See application file for complete search history.

(56) References Cited

U.S. PATENT DOCUMENTS

| | | | | |
|---|---|---|---|---|
| 6,240,740 | B1* | 6/2001 | Endo .................... | F24F 1/0007 |
| | | | | 62/285 |
| 7,392,663 | B2* | 7/2008 | Kang .................. | B60H 1/3233 |
| | | | | 454/121 |
| 7,407,001 | B2* | 8/2008 | Newman ............ | B60H 1/00028 |
| | | | | 165/202 |
| 9,908,384 | B2* | 3/2018 | Ueno ................. | B60H 1/00514 |
| 2006/0053818 | A1* | 3/2006 | Yoshida ............... | B60H 1/3233 |
| | | | | 62/285 |
| 2010/0132392 | A1* | 6/2010 | Yasutomi .............. | F24F 13/222 |
| | | | | 62/291 |
| 2016/0001637 | A1* | 1/2016 | Kume .................. | B60H 1/3233 |
| | | | | 62/285 |
| 2016/0114648 | A1* | 4/2016 | Ueno ................. | B60H 1/00564 |
| | | | | 62/296 |
| 2016/0325603 | A1 | 11/2016 | Yamadaki et al. | |

FOREIGN PATENT DOCUMENTS

| | | | |
|---|---|---|---|
| JP | 08258555 | A * | 10/1996 |
| JP | 2006069441 | A | 3/2006 |
| JP | 2008062843 | A | 3/2008 |
| JP | 2010158947 | A | 7/2010 |
| JP | 2010158948 | A | 7/2010 |
| JP | 2011152850 | A | 8/2011 |
| JP | 2015116957 | A | 6/2015 |

\* cited by examiner

FIG. 4

VEHICULAR AIR-CONDITIONING UNIT

CROSS REFERENCE TO RELATED APPLICATIONS

This application is a U.S. National Phase Application under 35 U.S.C. 371 of International Application No. PCT/JP2017/004781 filed on Feb. 9, 2017. This application is based on and claims the benefit of priority from Japanese Patent Application No. 2016-075952 filed on Apr. 5, 2016. The entire disclosures of all of the above applications are incorporated herein by reference.

TECHNICAL FIELD

The present disclosure relates to a vehicular air-conditioning unit that performs air conditioning for a vehicle compartment.

BACKGROUND ART

Patent Document 1 discloses an example of such vehicular air-conditioning unit. The vehicular air-conditioning unit of Patent Document 1 includes an evaporator and a casing for housing the evaporator. In the vehicular air-conditioning unit of Patent Document 1, a condensed water generated on the evaporator is drained through a drainage hole out of the vehicular air-conditioning unit.

According to the vehicular air-conditioning unit of Patent Document 1, the condensed water is drained without touching the outermost part of the casing.

PRIOR ART DOCUMENT

Patent Document

Patent Document 1: JP 2011-152850 A

SUMMARY OF THE INVENTION

In a conventional vehicular air-conditioning unit, an air-conditioning case corresponding to the above-described casing includes multiple casing parts, and the casing parts are integrated with each other to constitute the casing. In recent years, in order to make the vehicle air-conditioning unit small and inexpensive, the fitting portions between the casing parts are arranged near, for example, the lower portion of the evaporator accommodated in the air-conditioning case.

In such a vehicle air-conditioning unit, the condensed water of the evaporator is normally discharged from a drainage hole as in the vehicle air-conditioning unit of Patent Document 1. The air-conditioning case is configured to store a certain amount of water therein. This is to prevent the condensed water of the evaporator from leaking from the fitting portion between the case parts.

However, in the conventional vehicle air-conditioning unit, drainage from the air-conditioning case was sacrificed because the air-conditioning case has the structure that holds the condensed water. For example, in the air-conditioning case, water entering the downstream space into which the air having passed through the evaporator flows may not be drained. And the water entering the downstream space remains in the downstream space until it evaporated. The above-described facts have been found by the inventors of the present disclosure.

In view of the above points, it is an objective of the present disclosure to provide a vehicular air-conditioning unit that drains water from a downstream space of an air-conditioning case.

In order to achieve the above objective, a vehicular air-conditioning unit according to an aspect of the present disclosure that performs an air conditioning of a vehicle compartment includes: a cooler configured to cool air blown into the vehicle compartment; and an air-conditioning case having a cooler accommodation portion defining a cooler accommodation space in which the cooler is accommodated, and a downstream portion defining a downstream space into which air having passed through the cooler flows. The cooler accommodation portion includes an accommodation bottom portion constituting a bottom portion of the cooler accommodation portion and defining a bottom portion space that is a part of the cooler accommodation space. The accommodation bottom portion includes a drainage hole through which condensed water from the cooler entering the bottom portion space is drained, the drainage hole being located closer to one end of the accommodation bottom portion than to another end of the accommodation bottom portion in a longitudinal direction of a lower end of the cooler. The accommodation bottom portion includes a bottom surface defining a lower part of the bottom portion space. At least a part of the bottom surface is inclined with respect to a horizontal line to collect the condensed water entering the bottom portion space to the drainage hole. The air-conditioning case includes a bottom portion rib separating the bottom portion space and the downstream space from each other. The bottom portion rib includes a communication slit through which the bottom portion space and the downstream space communicate with each other. The communication slit is located, within a range in which the accommodation bottom portion is provided, closer to the one end than to the other end in the longitudinal direction.

As described above, since the communication slit for communicating the bottom portion space and the downstream space is formed in the bottom portion rib of the air-conditioning case, the water entering the downstream space is guided to the bottom portion space, and the water in the bottom space can be discharged from the drainage hole.

The drainage hole is disposed at a position near the one end of the accommodation bottom portion in the longitudinal direction of the lower end of the cooler. In addition, the communication slit is closer to the one side compared to the other side in the range occupied by the accommodating bottom portion in the longitudinal direction. The bottom surface of the accommodation bottom portion is, in at least a portion of its bottom surface, inclined with respect to the horizontal line so that the condensed water entering the bottom portion space gathers in the drainage hole. Accordingly, the lower end of the communication slit can be positioned at a lower part due to the inclination of the bottom surface of the accommodation bottom portion. Therefore, the performance in drainage from the downstream space can be improved.

EMBODIMENTS FOR EXPLOITATION OF THE INVENTION

Description of Embodiments

Hereinafter, embodiments of the present disclosure will be described with reference to the drawings. In the following embodiments, the same or equivalent parts are denoted by the same reference numerals as each other, and explanations will be provided to the same reference numerals.

First Embodiment

Figure 1:
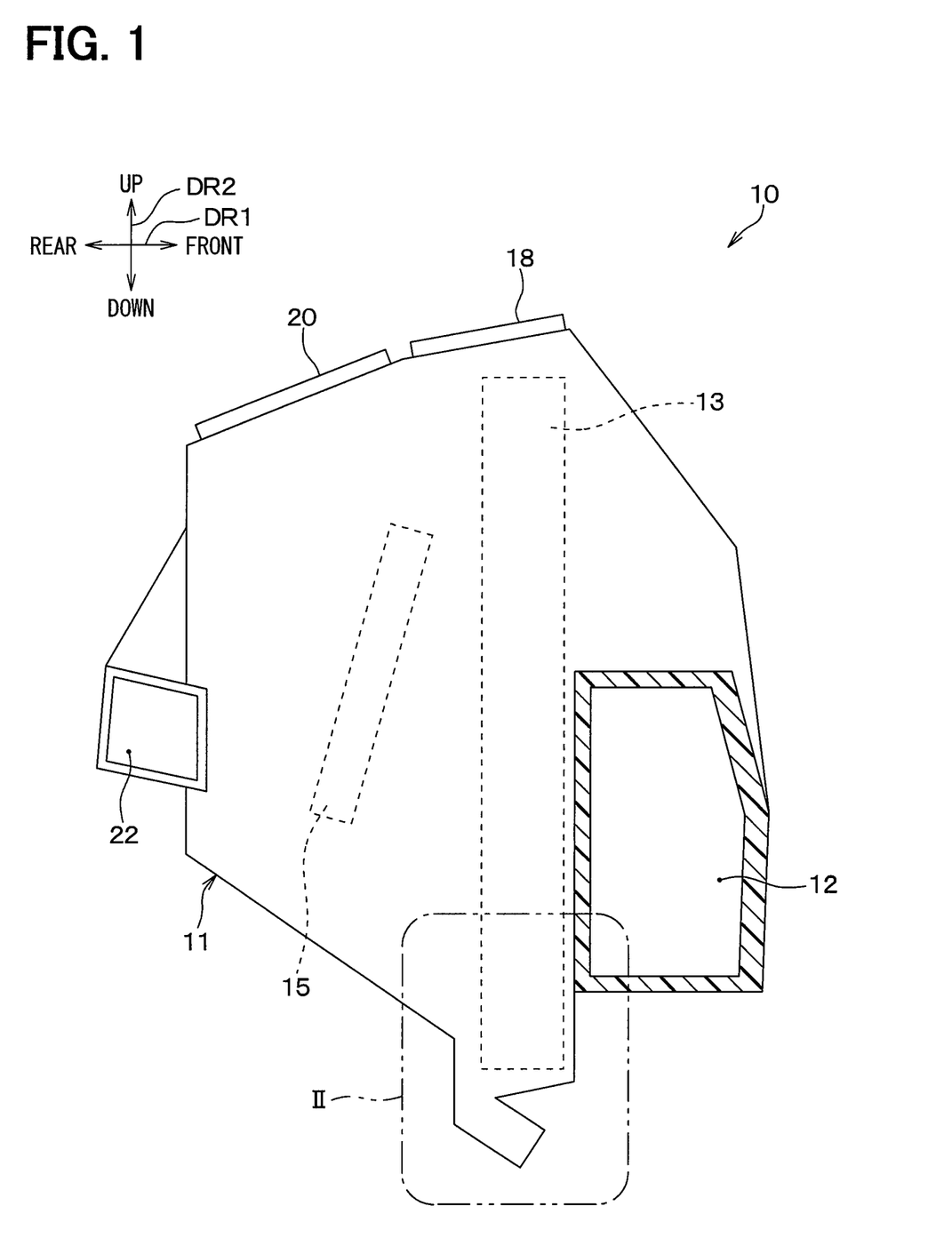
FIG. 1 is an exterior view illustrating a schematic configuration of a vehicular air-conditioning unit according to a first embodiment.
Figure 2:
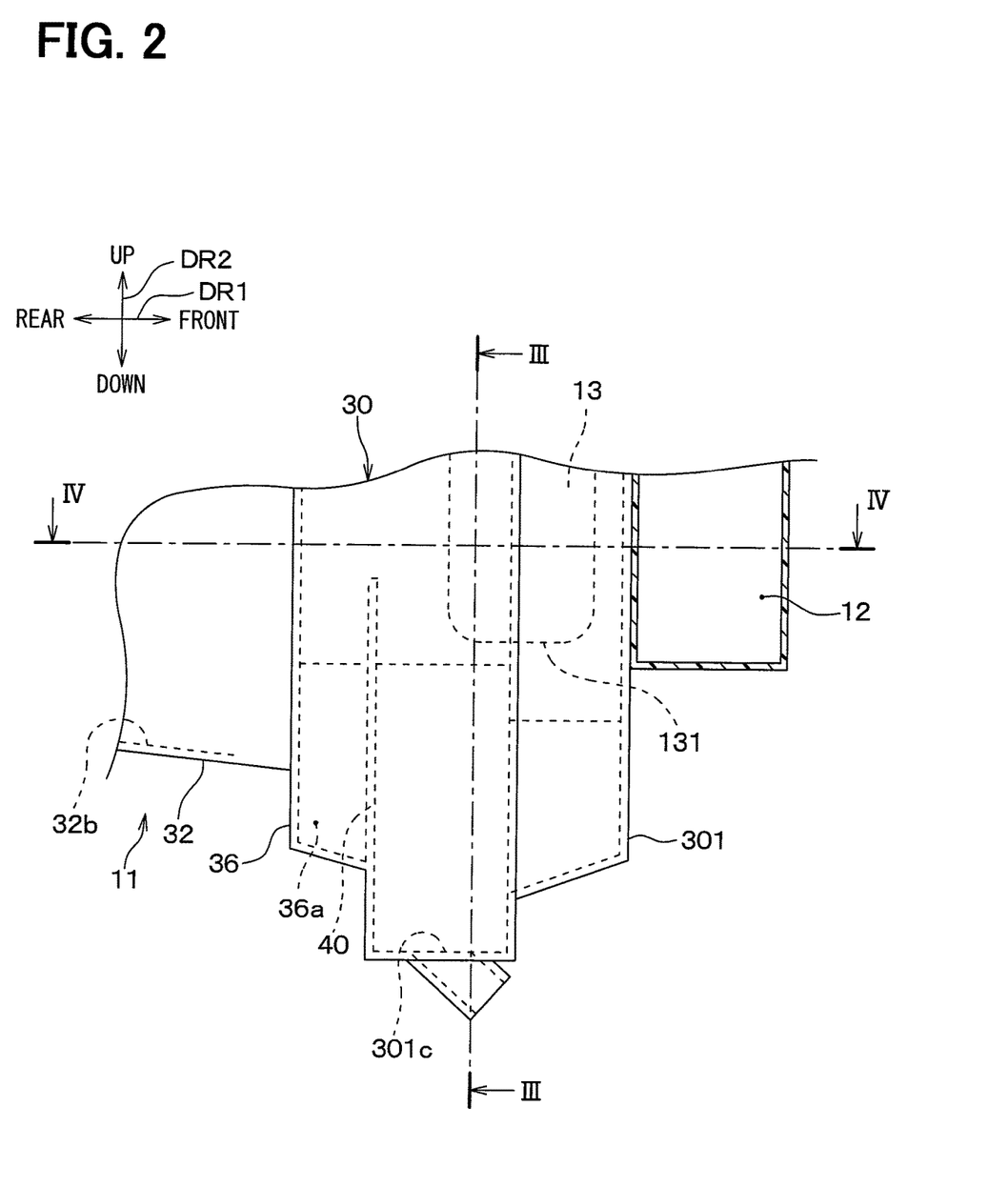
FIG. 2 is a detail view of a portion II shown in FIG. 1.
Figure 3:
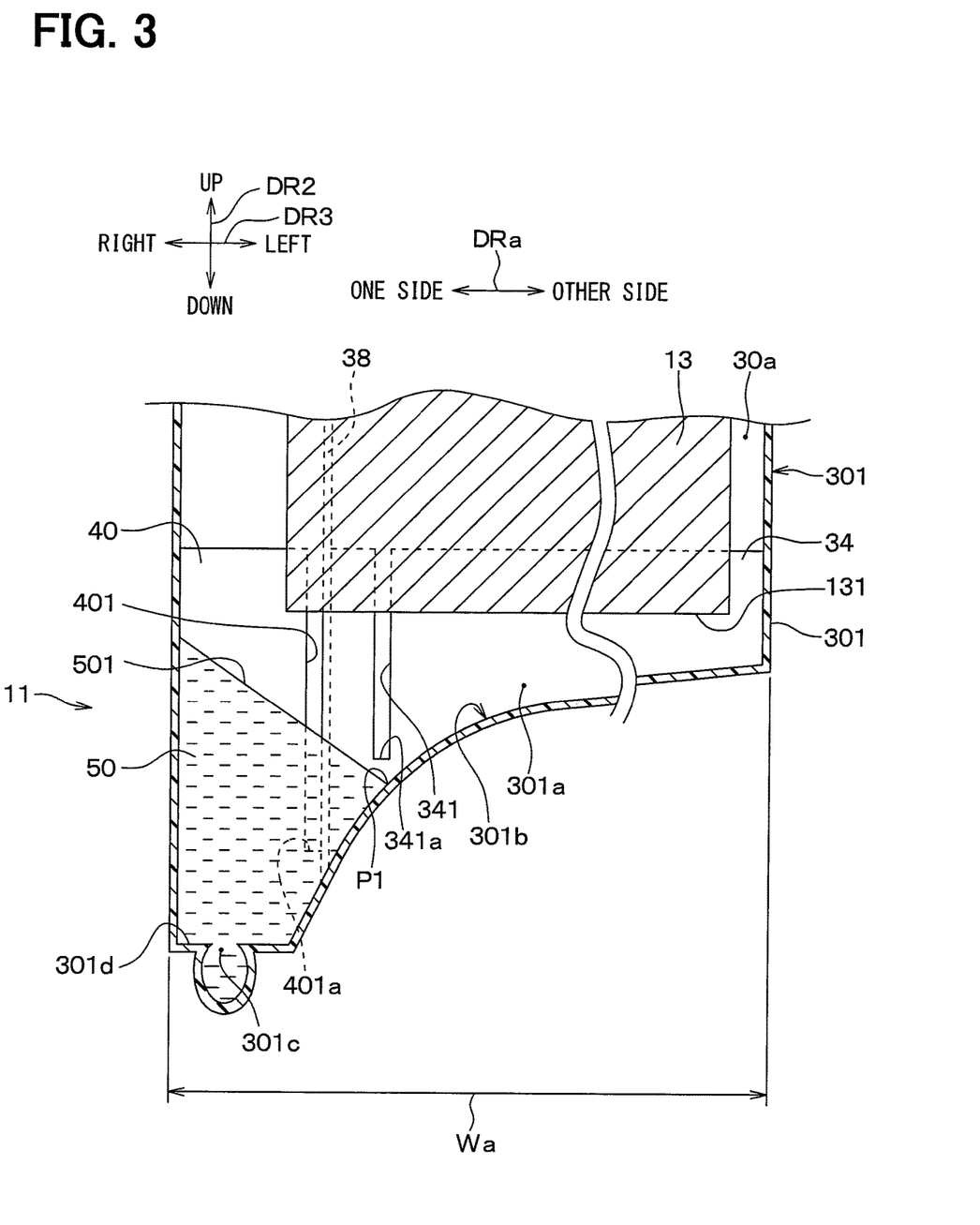
FIG. 3 is a cross-sectional view taken along a line III-III in FIG. 2.

FIG. 1 is an exterior view illustrating a schematic configuration of a vehicular air-conditioning unit 10 of the present embodiment. Arrows DR1 and DR2 in FIG. 1 and an arrow DR3 in FIG. 3 represent directions with respect to the vehicle in which the vehicle air-conditioning unit 10 is mounted. That is, the orientation indicator DR1 shows a front-rear direction DR1 of the vehicle, and the orientation indicator DR2 shows a up-down direction DR2 of the vehicle, in FIG. 1. In FIG. 2, the orientation indicator DR3 shows a width direction DR3 of the vehicle. The width direction DR3 is, i.e., a left-right direction DR3 of the vehicle.

The vehicular air-conditioning unit 10 (hereinafter, simply referred to as air-conditioning unit 10) shown in FIG. 1 is included in an indoor unit portion that constitutes a part of a vehicular air-conditioner including a refrigeration cycle constituted by a compressor and a condenser provided in an engine room, for example. The air-conditioning unit 10 is located substantially at the center, in a vehicle width direction DR3, in the instrument panel (not shown) provided in the front part of the vehicle compartment. An indoor unit portion of the vehicular air-conditioner includes the air-conditioning unit 10 and a blower portion (not shown). The air-conditioning unit 10 is an air-conditioning portion performing an air-conditioning in the vehicle compartment. The blower portion is provided in the instrument panel and offset from the air-conditioning unit 10 to a front passenger seat.

This blower portion includes, as is well known: an inside-outside air switching box for selectively introducing the outside air that is the air outside the vehicle compartment and the inside air that is the air inside the vehicle compartment; and a centrifugal blower that blows the air introduced into the inside-outside air switching box. The blown air in the blower portion flows into an air inflow space 12 at the forefront in an air-conditioning case 11 of the air conditioning unit 10 shown in FIG. 1.

The air-conditioning unit 10 includes the air-conditioning case 11, an evaporator 13, a heater core 15, and doors (not shown), for example.

The air-conditioning case 11 defines therein a passage of air flowing toward the interior of the vehicle compartment. In addition, the air-conditioning case 11 accommodates the evaporator 13, the heater core 15, and doors. In addition, the air-conditioning case 11 supports the evaporator 13, the heater core 15, and doors.

The air-conditioning case 11 is formed of a resin (e.g. polypropylene) having a certain degree of elasticity and an excellent strength. The air-conditioning case 11 is formed by integrating multiple case members, which are resin molded products, with one another due to the convenience of die-cutting during molding and the reasons for mounting the air-conditioning equipment on the case.

In the air-conditioning case 11 of the air-conditioning unit 10, the evaporator 13 is arranged vertically in the vehicle up-down direction DR2 behind the air inflow space 12. That is, the evaporator 13 is arranged so that the air passing through the evaporator 13 flows from the front to the rear of the evaporator 13.

As is well known, low pressure refrigerant having decompressed by a decompression device such as an expansion valve of a vehicular air-conditioning refrigeration cycle flows in the evaporator 13, and this low pressure refrigerant absorbs heat from the blown air and evaporates the air. The evaporator 13 is configured to cool the blown air. In short, the evaporator 13 functions as a cooler for cooling the air blown out from the air-conditioning case 11 into the vehicle compartment.

The heater core 15 is a heating heat exchanger for heating the air. Specifically, as is well known, the heater core 15 heats the air by using hot water, which is an engine cooling water of a vehicle engine, as a heat source.

The heater core 15 is located downstream of the evaporator 13 with respect to the air flow in the air-conditioning case 11. The air cooled by the evaporator 13 is guided to the heater core 15. The ratio between the air volume of the air guided to the heater core 15 and the air volume of the air bypassing the heater core 15 is controlled by a door (not shown). By adjusting the ratio of the air volume, the temperature of the air blown out from the air-conditioning case 11 into the vehicular compartment is adjusted.

The air-conditioning case 11 includes multiple air outlets 18, 20, 22 through which the air is blown into the vehicle compartment. The air having passed through the evaporator 13, the air having passed through both the evaporator 13 and the heater core 15, and the mixed air are blown out through the air outlets 18, 20, 22. Opening-closing doors (not shown) are provided at the multiple air outlets 18, 20, 22, and the air outlets 18, 20, 22 are opened and closed by the opening-closing doors.

Specifically, the air outlets 18, 20, 22 are the defogger air outlet 18, the face air outlet 20, and the foot air outlet 22. The defogger air outlet 18 is an air outlet for blowing air toward the inner surface of the windshield. The face air outlet 20 is an air outlet for blowing air toward the upper half of the occupant seated in the front seat. The foot air outlet 22 is an air outlet for blowing air toward the foot of the passenger in the vehicle compartment.

Figure 4:
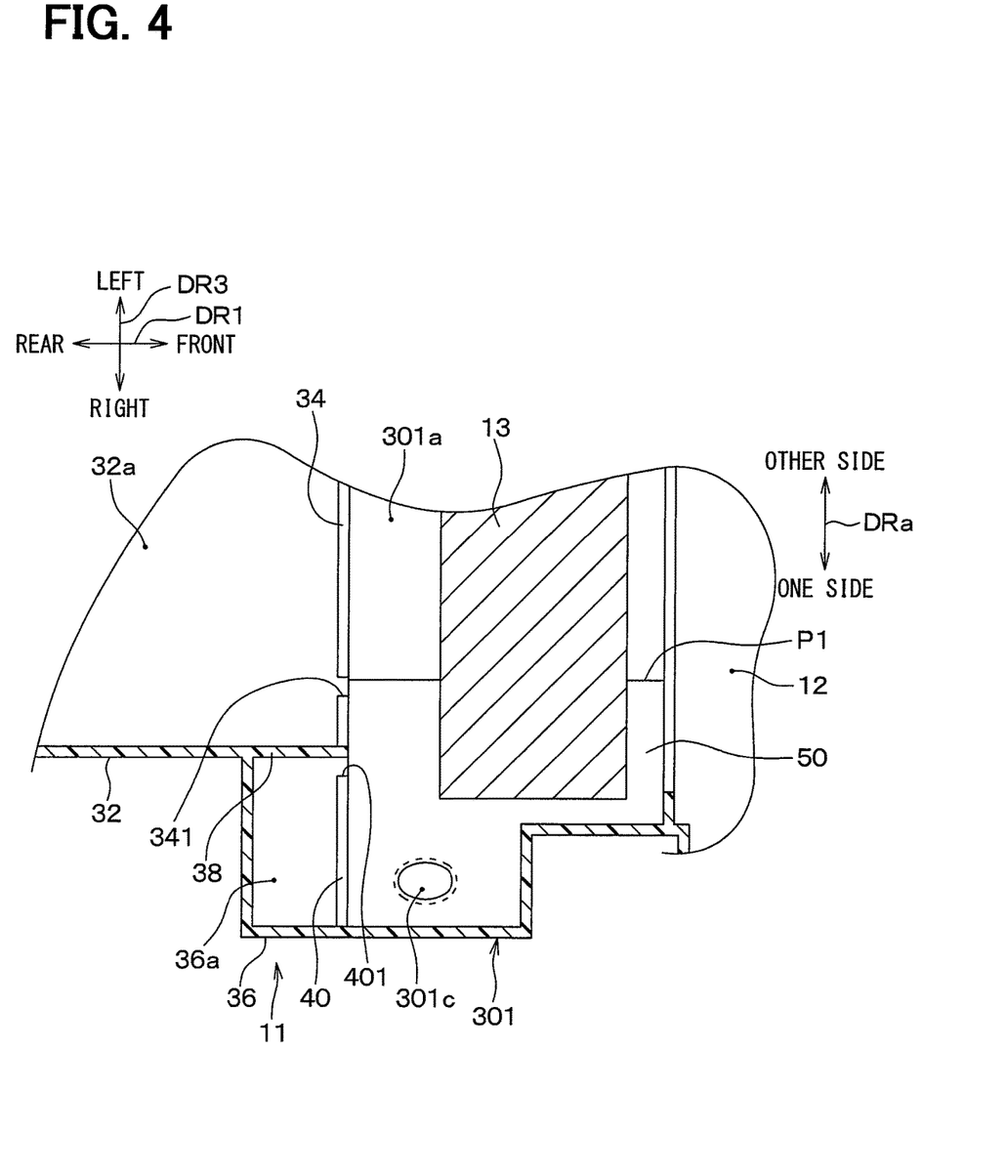
FIG. 4 is a cross-sectional view taken along a line IV-IV in FIG. 2.

Since the air-conditioning case 11 houses the evaporator 13 that is a cooler as described above, the air-conditioning case 11 includes a cooler accommodation portion 30 that has a structure for collecting and draining a condensed water generated due to the cooling of the air by the evaporator 13. As shown in FIGS. 2 to 4, the cooler accommodation portion 30 defines therein a cooler accommodation space 30a accommodating the evaporator 13. The air-conditioning case 11 has a downstream portion 32 defining a downstream space 32a into which air having passed through the evaporator 13 flows.

The downstream space 32a is defined in a lower part of the air-conditioning case 11 below the cooler accommodation space 30a such that the downstream space 32a does not interrupt the flow of the air flowing from the evaporator 13. The cooler accommodation space 30a and the downstream space 32a respectively constitute a part of the air passage in the air-conditioning case 11.

Further, the cooler accommodation portion 30 has an accommodation bottom portion 301 which forms the bottom portion, that is, the lower part of the cooler accommodation portion 30. Since the accommodation bottom portion 301 is a part of the cooler accommodation portion 30, a bottom portion space 301a as a part of the cooler accommodation space 30a is formed in the accommodation bottom portion 301.

For example, due to the inclination of the vehicle, the fitting portion of the case members constituting the air-conditioning case 11 may come to a low position. In such a case, if the air-conditioning case 11 cannot store the condensed water of the evaporator 13 at all, the condensed water may leak from the fitting portion of the case members into the vehicle compartment. The air-conditioning case 11 of the present embodiment is provided with the accommodation bottom portion 301 to store a certain volume of water in order to prevent the condensed water from leaking into the vehicle compartment as described above.

In the present embodiment, the accommodation bottom portion 301 of the air-conditioning case 11 has a bottom surface 301b that defines the bottom side of the bottom portion space 301a. A drainage hole 301c for draining the condensed water of the evaporator 13 that has entered the bottom portion space 301a is formed in the bottom surface 301b of the accommodation bottom portion 301. The drainage hole 301c is a drainage port of the air-conditioning case 11 and communicates with the outside of the vehicle compartment such as the engine room and a space under the vehicle compartment. Therefore, the condensed water entering the bottom portion space 301a passes through the drainage hole 301c and is discharged to the outside of the vehicle compartment.

In detail, the drainage hole 301c is disposed at a position near one end of a lower end 131 of the evaporator 13 in the longitudinal direction DRa in the accommodation bottom portion 301. In the present embodiment, the longitudinal direction DRa of the lower end 131 of the evaporator 13, i.e. the evaporator lower end longitudinal direction DRa, corresponds to the vehicle width direction DR3.

The bottom surface 301b of the accommodation bottom portion 301 is, in at least a portion of its bottom surface 301b, inclined with respect to the horizontal line so that the condensed water entering the bottom portion space 301a gathers in the drainage hole 301c. That is, the bottom surface 301b includes an inclined surface that decreases in elevation toward the drainage hole 301c in the evaporator lower end longitudinal direction DRa. The drainage hole 301c opens at a lowermost portion 301d located in the lowermost part in the bottom surface 301b of the accommodation bottom portion 301. As a result, when the condensed water enters the bottom portion space 301a, the condensed water is guided to the drainage hole 301c and discharged from the drainage hole 301c to the outside of the vehicle compartment.

The air-conditioning case 11 has a bottom portion rib 34 in the air-conditioning case 11. The bottom portion rib 34 partitions between the bottom portion space 301a and the downstream space 32a. In detail, the bottom portion rib 34 extends along the evaporator lower end longitudinal direction DRa. The left and right end edges and the lower end edge of the bottom portion rib 34 are connected to the inner wall surface of the air-conditioning case 11.

Therefore, the bottom portion rib 34 serves as a water retaining rib for storing the condensed water in the bottom portion space 301a. Then, the air flowing out of the evaporator 13 flows to the downstream space 32a through the upper side of the bottom portion rib 34.

A communication slit 341 as a communicating path connecting the bottom portion space 301a and the downstream space 32a is formed in the bottom portion rib 34. The communication slit 341 is provided on the same side as the drainage hole 301c in the evaporator lower end longitudinal direction DRa. That is, the communication slit 341 is closer to the one end compared to the other end in the range Wa occupied by the accommodating bottom portion 301 in the evaporator lower end longitudinal direction DRa.

Further, the lowermost portion 301d of the bottom surface 301b of the accommodation bottom portion 301 is closer to the one side than the communication slit 341 is to in the lower end longitudinal direction DRa of the evaporator. In the evaporator lower end longitudinal direction DRa, the bottom surface 301b of the accommodation bottom portion 301 is inclined to decrease in elevation toward its one end in both a part between the communication slit 341 and the lowermost portion and a part closer to the other end opposite from the one end than the communication slit is to.

Since the communication slit 341 has a groove shape extending from the upper end of the bottom portion rib 34, the upper end of the communication slit is open in the air passage in the air-conditioning case 11. The communication slit 341 has a communication slit lower end 341a.

The communication slit lower end 341a is spaced apart upward from the bottom surface 301b of the accommodation bottom portion 301. That is, the communication slit 341 does not reach the bottom surface 301b of the accommodation bottom portion 301 in the vehicle up-down direction DR2.

The downstream portion 32 includes a downstream portion bottom surface 32b that faces the downstream space 32a from the lower side of the downstream space 32a, and the downstream portion bottom surface 32b is inclined to lower toward the rear side in the vehicle front-rear direction DR1. That is, the downstream portion bottom surface 32b is inclined so as to lower toward the communication slit 341 of the bottom portion rib 34. Therefore, water (e.g. condensed water) entering the downstream space 32a for some reason flows toward the communication slit 341 due to the inclination of the downstream portion bottom surface 32b. For example, the communication slit 341 reaches the downstream portion bottom surface 32b, and a communication slit lower end 341a is continuous with the downstream portion bottom surface 32b.

The air-conditioning case 11 includes a water storage portion 36 aligned with the downstream portion 32 in the evaporator lower end longitudinal direction DRa and located on one side of the downstream portion. The water storage portion 36 forms a water storage space 36a for storing water.

The air-conditioning case 11 includes a partition wall 38 located between the water storage space 36a and the downstream space 32a, and a side of the water storage space 36a adjacent to the downstream space 32a is closed by the partition wall 38. That is, the water storage space 36a is partitioned from the downstream space 32a by the partition wall 38.

The air-conditioning case 11 has a water storage portion rib 40 that partitions the bottom portion space 301a and the water storage space 36a. The water storage rib 40 has the same height as the bottom portion rib 34, for example.

A water storage portion communication groove 401 as a communicating path connecting the bottom portion space 301a and the water storage space 36a is formed in the water storage portion rib 40. That is, the water storage space 36a communicates with the bottom portion space 301a via the water storage portion communication groove 401. The water storage portion communication groove 401 has, for example, a slit shape extending in the vehicle up-down direction DR2. The water storage portion communication groove 401 is closer to the other side than the drainage hole 301c is to in the evaporator downstream longitudinal direction DRa. The water storage portion communication groove 401 is closer to the one side than the communication slit 341 is to in the evaporator downstream longitudinal direction DRa.

In addition, since the water storage portion communication groove 401 has a groove shape extending from the upper end of the water storage portion rib 40, the upper end of the water storage portion communication groove 401 is open. The water storage portion communication groove 401 has a communication groove lower end 401a that is the lower end of the water storage portion communication groove 401.

The communication groove lower end 401a is spaced apart upward from the bottom surface 301b of the accommodation bottom portion 301 similarly to the communication slit lower end 341a. That is, the water storage portion communication groove 401 does not reach the bottom surface 301b of the accommodation bottom portion 301 in the vehicle up-down direction DR2. However, the communication groove lower end 401a is positioned below the communication slit lower end 341a.

In the present embodiment, the communication slit 341 is positioned in consideration of a possibility that the condensed water in the bottom portion space 301a may gather to the one side in the vehicle width direction DR3 when the vehicle including the air-conditioning unit 10 turns in one direction. The turn of the vehicle in the one direction is a turn of the vehicle in which the one side of the evaporator lower end longitudinal direction DRa is on an outside of a turning radial direction. When the vehicle turns in the other direction opposite from the one direction, the condensed water moves toward the other side of the vehicle width direction DR3 in the bottom portion space 301a, and the condensed water moves away from the communication slit 341. Therefore, there is no need to consider the turn in the other direction in arranging the communication slit 341.

Specifically, the communication slit 341 is arranged in a consideration of an imaginary condition. In the imaginary condition, a predetermined acceleration is given to the air-conditioning case 11, and accordingly a predetermined volume of water 50 (e.g. condensed water) retained in the bottom portion space 301a moves to the one side of the evaporator lower end longitudinal direction DRa in the bottom portion space 301a. The communication slit 341 is designed to correspond to a lowermost position P1 of an inclined liquid surface 501 of the water 50 in the imaginary condition. To design the communication slit 341 in consideration of the position P1 that is a liquid surface lowest position P1 at which the liquid surface 501 is the lowest includes a meaning that a position of the communication slit 341 in the evaporator lower end longitudinal direction DRa is approximately the same as a position of the liquid surface lowest position P1.

The communication slit 341 is designed so as not to intersect the inclined liquid surface 501 of the water 50 in the imaginary condition.

The predetermined acceleration in the imaginary condition corresponds to a centripetal force generated when the vehicle turns in one direction, and is preliminarily determined through experiments using an actual vehicle traveling. For example, the predetermined acceleration is determined as an acceleration which is given to the air-conditioning case 11 when a vehicle turns at a predetermined reference speed with a reference turning radius. The predetermined volume of the water is the volume of water stored in a condition where the drainage hole 301c is closed, and is experimentally determined based on the volume of the condensed water generated on the evaporator 13 per unit time.

As described above, according to the present embodiment, the bottom portion rib 34 of the air-conditioning case 11 includes the communication slit 341 through which the bottom portion space 301a and the downstream space 32a communicate with each other. Accordingly, the water entering the downstream space 32a is guided to the bottom portion space 301a, and the water entering the bottom portion space 301a can be drained through the drainage hole 301c. That is, the water entering the downstream space 32a can be drained through the drainage hole 301c.

In detail, the drainage hole 301c is disposed at a position near the one side in the evaporator lower end longitudinal direction DRa in the accommodation bottom portion 301. In addition, the communication slit 341 is closer to the one side compared to the other side in the range Wa occupied by the accommodating bottom portion 301 in the evaporator lower end longitudinal direction DRa. The bottom surface 301b of the accommodation bottom portion 301 is inclined, in at least a portion of its bottom surface 301b, with respect to the horizontal line so that the condensed water entering the bottom portion space 301a gathers in the drainage hole 301c. Accordingly, the communication slit lower end 341a of the communication slit 341 can be positioned at a lower part due to the inclination of the bottom surface 301b of the accommodation bottom portion 301. Therefore, the performance in drainage from the downstream space 32a can be improved.

If the performance in drainage from the air-conditioning case 11 is low, the condensed water may adhere to the air-conditioning case 11, and bad smell may occur. However, since the performance in drainage from the downstream space 32a can be improved, the possibilities for adhesion of the condensed water and occurrence of bad smell can be reduced.

According to the present embodiment, the imaginary condition may be assumed, in which a predetermined acceleration is given to the air-conditioning case 11 and accordingly a predetermined volume of the condensed water retained in the bottom portion space 301a moves to the one side of the evaporator lower end longitudinal direction DRa in the bottom portion space 301a. The communication slit 341 is designed in consideration of the lowermost position P1 of the inclined liquid surface 501 of the water 50 in the imaginary condition. Accordingly, the communication slit lower end 341a can be easily positioned at a lower position as long as the liquid surface 501 of the water 50 that may incline does not overlap the communication slit 341. Therefore, the performance in drainage from the downstream space 32a by the communication slit 341 can be improved without decrease in the storage capacity of the condensed water in the bottom portion space 301a.

According to the present embodiment, the communication slit 341 is designed so as not to intersect the inclined liquid surface 501 of the water 50 in the imaginary condition. Accordingly, the storage capacity of the condensed water in the bottom portion space 301a can be maintained at or above the predetermined volume.

According to the present embodiment, the communication slit lower end 341a is spaced apart upward from the bottom surface 301b of the accommodation bottom portion 301. Accordingly, the condensed water flows below the communication slit lower end 341a even when the condensed water stored in the bottom portion space 301a moves on the bottom surface 301b of the accommodation bottom portion 301 in the evaporator lower end longitudinal direction DRa, e.g. when the vehicle turns. The water would not enter the downstream space 32a through the communication slit 341 as long as the water flows below the communication slit lower end 341a.

According to the present embodiment, the air-conditioning case 11 includes a water storage portion 36 aligned with the downstream portion 32 in the evaporator lower end longitudinal direction DRa. The water storage portion 36 defines the water storage space 36a that is partitioned from the downstream space 32a and communicates with the bottom portion space 301a. Accordingly, the storage capacity of the condensed water in the air-conditioning case 11 other than the downstream space 32a can be increased using the spaces aligned with the downstream portion 32 in the evaporator lower end longitudinal direction DRa.

According to the present embodiment, the water storage space 36a communicates with the bottom portion space 301a through the water storage portion communication groove 401 having a slit shape, and the water storage portion communication groove 401 is designed such that the communication groove lower end 401a is located at a lower part lower than the communication slit lower end 341a. Accordingly, the condensed water stored in the bottom portion space 301a is likely to flow through the water storage portion communication groove 401 not through the communication slit 341, and the storage performance of the water storage portion 36 can easily be improved.

Further, according to the present embodiment, the drainage hole 301c is provided at the lowermost portion 301d of the bottom surface 301b of the accommodation bottom portion 301, and the lowermost portion 301d is closer to the one side in the evaporator lower end longitudinal direction DRa than the communication slit 341 is to the one side. Accordingly, the predetermined volume of water in the imaginary condition can be increased compared to a case where the positions of the lowermost portion 301d and the communication slit 341 are swapped in the evaporator lower end longitudinal direction DRa. That is, the storage capacity of the condensed water in the bottom portion space 301a can be maintained to be large.

(Other Embodiment)

(1) In the above-described embodiment, the air-conditioning portion of the indoor unit portion of the vehicular air-conditioner is referred to as the air-conditioning unit 10. However, the air-conditioning portion and the blower portion of the indoor unit portion may be referred to as the air-conditioning unit 10 as a whole.

(2) In the above-described embodiment, the communication slit 341 has a constant width in the evaporator lower end longitudinal direction DRa regardless of parts in the vehicle up-down direction DR2. However, this is just an example, and the communication slit 341 is not necessary to have a constant width. The shape of the communication slit 341 may be determined as appropriate. Such configuration may be applied to the water storage portion communication groove 401.

The above-described embodiment is not intended to be exhaustive or to limit the disclosure. The present disclosure is intended to cover various modification and equivalent arrangements. Individual elements or features of a particular embodiment are not necessarily essential unless it is specifically stated that the elements or the features are essential in the foregoing description, or unless the elements or the features are obviously essential in principle.

A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

(Conclusion)

According to a first aspect disclosed in a part or a whole part of the embodiment, the drainage hole for draining the condensed water of the cooler entering the bottom portion space is provided at a position near the one side of the accommodation bottom portion of the air-conditioning case in the longitudinal direction of the lower end of the cooler. The bottom surface of the accommodation bottom portion is, in at least a portion of its bottom surface, inclined with respect to the horizontal line so that the condensed water entering the bottom portion space gathers in the drainage hole. The communication slit of the bottom portion rib partitioning the bottom portion space from the downstream space is closer to the one side compared to the other side in the range occupied by the accommodating bottom portion in the evaporator lower end longitudinal direction.

According to a second aspect, the imaginary condition may be assumed, in which a predetermined acceleration is given to the air-conditioning case and accordingly a predetermined volume of the condensed water retained in the bottom portion space moves to the one side of the longitudinal direction in the bottom portion space. The communication slit is designed in consideration of the lowermost position of the inclined liquid surface of the condensed water in the imaginary condition. Accordingly, the communication slit lower end that is a lower end of the communication slit can be easily positioned at a lower position as long as the liquid surface of the condensed water that may incline does not overlap the communication slit. Therefore, the performance in drainage from the downstream space by the communication slit can be improved without decrease in the storage capacity of the condensed water in the bottom portion space.

According to a third aspect, the communication slit lower end is spaced apart upward from the bottom surface of the accommodation bottom portion. Accordingly, the condensed water flows below the communication slit lower end even when the condensed water stored in the bottom portion space moves on the bottom surface of the accommodation bottom portion in the longitudinal direction, e.g. when the vehicle turns.

According to a fourth aspect, the air-conditioning case includes the water storage portion aligned with the downstream portion in the longitudinal direction. The water storage portion defines the water storage space that is partitioned from the downstream space and communicates with the bottom portion space. Accordingly, the storage capacity of the condensed water in the air-conditioning case other than the downstream space can be increased using the spaces aligned with the downstream portion in the longitudinal direction.

According to a fifth aspect, the water storage space communicates with the bottom portion space through the water storage portion communication groove having a slit shape, and the water storage portion communication groove is designed such that the lower end of the water storage communication groove is located below the communication slit lower end. Accordingly, the condensed water stored in the bottom portion space is likely to flow through the water storage portion communication groove not through the communication slit, and the storage performance of the water storage portion can easily be improved.

Further, according to a sixth embodiment, the drainage hole is provided at the lowermost portion of the bottom surface of the accommodation bottom portion, and the lowermost portion is closer to the one side in the longitudinal direction than the communication slit is to the one side. Accordingly, the predetermined volume of water in the imaginary condition can be increased compared to a case where the positions of the lowermost portion and the communication slit are swapped in the longitudinal direction, and the storage capacity of the condensed water stored in the bottom portion space can be large.

What is claimed is:

1. A vehicular air-conditioning unit that performs an air conditioning of a vehicle compartment, the vehicular air-conditioning unit comprising:
    a cooler configured to cool air blown into the vehicle compartment; and
    an air-conditioning case having
        a cooler accommodation portion defining a cooler accommodation space in which the cooler is accommodated, and
        a downstream portion defining a downstream space into which air having passed through the cooler flows, wherein
    the cooler accommodation portion includes an accommodation bottom portion constituting a bottom portion of the cooler accommodation portion and defining a bottom portion space that is a part of the cooler accommodation space,
    a direction along which a lower surface of the cooler extends is defined as a longitudinal direction of the lower surface of the cooler, the longitudinal direction being perpendicular to a flow direction of the air passing through the cooler,
    the accommodation bottom portion includes a drainage hole through which condensed water from the cooler entering the bottom portion space is drained, the drainage hole being located closer to one end of the accommodation bottom portion than to another end of the accommodation bottom portion in the longitudinal direction,
    the accommodation bottom portion includes a bottom surface defining a lower part of the bottom portion space,
    at least a part of the bottom surface is inclined with respect to a horizontal line to collect the condensed water entering the bottom portion space to the drainage hole,
    the air-conditioning case includes a bottom portion rib separating the bottom portion space and the downstream space from each other,
    the bottom portion rib includes a communication slit through which the bottom portion space and the downstream space communicate with each other,
    the communication slit is closer to the one end than to the other end in the longitudinal direction,
    the bottom portion rib extends upward from the bottom surface of the accommodation bottom portion,
    the communication slit has a communication slit lower end, and
    the communication slit lower end is located above and away from the bottom surface of the accommodation bottom portion.

2. The vehicular air-conditioning unit according to claim 1, wherein
    the air-conditioning case includes a water storage portion aligned with the downstream portion in the longitudinal direction, and
    the water storage portion defines a water storage space separated from the downstream space and communicating with the bottom portion space.

3. The vehicular air-conditioning unit according to claim 1, wherein
    the air-conditioning case includes a water storage portion aligned with the downstream portion in the longitudinal direction,
    the water storage portion defines a water storage space separated from the downstream space and communicating with the bottom portion space through a water storage portion communication groove having a slit shape, and
    a lower end of the water storage communication groove is located below the communication slit lower end.

4. The vehicular air-conditioning unit according to claim 1, wherein
    the drainage hole is open at a lowest part of the bottom surface of the accommodation bottom portion, and
    the lowest part is located between the one end and the communication slit in the longitudinal direction.

* * * * *